3,452,143
CYCLIC KETONE DIAMINES AS SOIL FUNGICIDES
AND BACTERICIDES
Nathaniel Grier, Englewood, N.J., assignor to Merck & Co., Inc., Rahway, N.J., a corporation of New Jersey
No Drawing. Continuation-in-part of application Ser. No. 423,360, Jan. 4, 1965. This application May 1, 1967, Ser. No. 634,907
Int. Cl. A01n 9/20, 7/04
U.S. Cl. 424—325  20 Claims

ABSTRACT OF THE DISCLOSURE

Compositions of cyclic ketone diamines and their salts with solid carriers and nonhydroxylic solvents are disclosed. These compositions may be employed as soil fungicides and bactericides.

---

The present application is a continuation-in-part of the copending application of Nathaniel Grier, Ser. No. 423,360 filed Jan. 4, 1965, which in turn is a continuation-in-part of application, Ser. No. 165,028 filed Jan. 8, 1962, entitled "Process and Compositions for Protecting Materials Against Fungal and Bacterial Infection," now abandoned.

The present invention relates to a method and compositions for the sterilization of soil for protecting seeds and plants, and in particular to improved antimicrobial compositions, both antifungal and antibacterial, for use in agriculture for the treatment of the soil to eradicate existing infections and to inhibit the growth of many species of destructive fungi and bacteria.

It is the general object of the invention to provide antimicrobial compositions characterized by a high degree of effectiveness in relatively low concentrations against various fungi and bacteria that infest the soil or are likely to find favorable conditions for growth therein once the soil is seeded and/or fertilized, whereby great economy in use is effected while simultaneously complete absence of phytotoxicity within the effective range of activity is secured.

It is a further object of the invention to provide soil fungicides and a method of treating the soil whereby an unusually healthy and vigorous growth in the root systems and tubers of plants of various kinds is promoted and likewise a luxuriant and healthy and high crop-yielding growth above ground.

It is a specific object of the invention to provide a soil fungicide which can be marketed in a highly concentrated form and is adapted for easy and uniform dilution, emulsification or suspension in large quantities of water or of organic liquid carriers in which it is homogeneously distributed for uniform application to large areas by spraying, by injection, or otherwise.

It is a still further object of the invention to provide fungicidal (and fungistatic) and bactericidal (and bacteriostatic) preparations which are highly effective in relatively low concentrations for sterilization of the soil to provide protection of seeds upon planting as well as of the root system of the growing plant, whereby unhindered germination and a healthy and abundant and even supernormal growth is secured.

Other objects and advantages of the invention will appear from the following more detailed description thereof.

In accordance with the present invention there are employed as soil fungicides and bactericides, compositions containing as their essential active ingredient a compound embraced by the following formula:

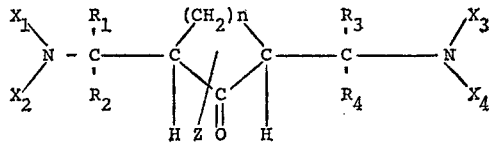

and its acid and quaternary salts, wherein:

$R_1$ to $R_4$ are each a member of the group consisting of hydrogen, alkyl having up to 18 carbons, aralkyl and cycloalkyl having up to 9 carbons;

$X_1$ to $X_4$ are each a member of the group consisting of hydrogen, alkyl having up to 18 carbons, hydroxyalkyl having up to 8 carbons, cycloalkyl having up to 9 carbons, aryl, and aralkyl having up to 9 carbons; while at least one of the pairs of $X_1$ and $X_2$, and $X_3$ and $X_4$, may be part of a saturated heterocyclic ring containing the indicated N and together with carbon also a further nuclear atom of the group consisting of carbon, oxygen, nitrogen and sulfur; $n$ is an integer from 1 to 6 inclusive; while Z represents one or more further substituents on the cyclohexanone ring which are non-reactive toward the amine and aldehyde, such as halogen (chloro, bromo or iodo), nitro, lower alkyl (having up to 8 carbons), lower alkoxy, hydroxyl, phenyl, phenyl-lower alkyl, such as benzyl, phenethyl, and phenyl-isobutyl, halogen groups in the 2- and 6-positions being preferably introduced in known manner after the condensation, as by treatment of the product with free halogen.

The compounds employed in the compositions of the present invention have shown unusual activity against fungi and bacteria and are useful for the sterilization of the soil for the protection of seeds planted and plants growing therein. As described more fully below, field tests with, for example, 2,6-bis-(dimethylaminomethyl)-cyclohexanone have shown a remarkable increase in the vigor and health of the root systems and in the above-soil growth, the latter being thick and luxuriant as distinguished from the tall but spindly growths obtained with many known plant stimulants and hormones. In addition, the crop, besides being frequently in greater yield than heretofore obtainable even with the aid of known antimicrobial agents, is of excellent and generally superior quality.

The compounds constituting the active components of the compositions of the present invention have been found not only to be highly potent agents for the destruction and inhibition of fungi and bacteria that infest the soil but to be distinguished at the same time by non-phytotoxicity within their active concentrations.

A further advantage which distinguishes the preparations of the present invention from certain commercially employed fungicides is that, whereas the latter have a high vapor pressure, so that they must be rototilled into the soil within a few hours after application to prevent loss of effectiveness, the compounds of the present invention have vapor pressures sufficiently low so that the discing or rototilling can be delayed beyond a few hours.

A still further advantage of the compositions employed in the present invention arises from the fact that they are free of toxic metals, like mercury and copper, so that such materials do not accumulate in the soil with repeated use.

Among the highly effective compounds for the control of soil-borne and seed-borne fungi and bacteria included in the above formula are 2,6-bis-(dimethylaminomethyl)-cyclohexanone;
2,5-bis-(dimethylaminomethyl)-cyclopentanone and its dihydrochloride concentrations;

2,6-bis-(di-n-propylaminomethyl)-cyclohexanone;
2,6-bis-(diethylaminomethyl)-cyclohexanone;
2-(dibenzylaminomethyl-6-(dimethylaminomethyl)-cyclohexanone and its dihydrochloride;
2,5-di-(morpholinomethyl)-cyclopentanone;
2-(dimethylaminomethyl)-6-(piperidinomethyl)-cyclohexanone dihydrochloride;
2-(dimethylaminomethyl)-6-(morpholinomethyl)-cyclohexanone;
2-(dimethylaminomethyl)-6-(thiazolinomethyl)-cyclohexanone;
2-(dimethylaminomethyl)-6-(pyrrolidinomethyl)-cyclohexanone;
2-(diethylaminomethyl)-6-(piperazinomethyl)-cyclohexanone;
2,4-bis-(dimethylaminomethyl)-cyclobutanone;
2-morpholinomethyl-5-dimethylaminomethyl-cyclopentanone;
2,8-bis-(diethylaminomethyl)-cyclooctanone;
2,7-bis-(dimethylaminomethyl)-cycloheptanone;
2,5-bis-(piperidinomethyl)-cyclopentanone;
2,6-bis-(piperidinomethyl)-cyclohexanone;
2,6-bis-(benzylmethylaminomethyl)-cyclohexanone; and
2,6-bis-(dibenzylaminomethyl)-cyclohexanone.

By heating corresponding molecular proportions of carbomenthone or isopulegone with formaldehyde (or so highly substituted higher aldehydes or ketones that they have no reactive hydrogens) and dimethylamine di-n-propylamine, di-n-butylamine, di-iso-propylamine, di-iso-butylamine, morpholine, piperidine, or other secondary amines, the corresponding bis-tertiary amino ketones are obtained which also are active against soil- and seed-borne fungi and bacteria.

Among the further nuclearly substituted cyclohexanone Mannich reaction products that are active soil fungicides are 2-, 3-, 4-lower alkyl-, such as 2-methyl-, 3-propyl-, 4-butyl-, and also 4-phenyl-, 4-(2'-chlorophenyl)-, 4-(3'-bromo-phenyl)-, 4-(4'-phenyl-phenyl)-, 4-benzyl-, 3-phenethyl-, 3-chloro-, 4-bromo-, 3-nitro-, 4-nitro-, and 3,5-dichloro- derivatives of 2,6-bis-(dimethylaminomethyl)-cyclohexanone,
2,6-bis-(dipropylaminomethyl)-cyclohexanone,
2,6-bis-(diethylamino-α-ethyl)-cyclohexanone,
2,6-bis-(diethanolaminomethyl)-cyclohexanone,
2,6-bis-(dipropanolaminomethyl)-cyclohexanone,
2,6-bis-(diallylaminomethyl)-cyclohexanone,
2,6-bis-(dibenzylaminomethyl)-cyclohexanone,
2,6-bis-(piperazinomethyl)-cyclohexanone, and
2,6-bis-(morpholinomethyl)-cyclohexanone.

It is not necessary to broadcast the antimicrobial composition over the whole area; it is sufficient to treat the soil in seed bands which may be no more than about 4 inches wide at the surface and separated by untreated zones approximately 8 inches wide. Thus, to conserve active material, it can be applied to the soil in bands separated by unplanted and untreated zones. Thus, for deep-rooted tomato plants, a 4 inch furrow about 8 inches deep can be dug, V-shaped, which, after being sprayed by the fungicide composition, is partly filled, and then again sprayed after which the furrow is filled in. The seeds are planted and covered by a planter or otherwise, and if desired top soil can be simultaneously further sprayed so that the trench is filled with soil which has been treated to a concentration of about 5 to 20 p.p.m. of the active material. In this way not only the seed and seedlings but also the mature plants are protected against fungal and bacterial attack, while at the same time less than even a third of the soil volume to a depth of 8 inches is treated with the antimicrobial composition.

The compositions of the present invention can be used with advantage in sterilizing the soil on which are grown various vegetables, fruits, animal feed and other agricultural products, such as beans, soy beans, sugar beets, carrots, oats and clover, among others; in short, to all types of plants, regardless of whether the crop is in the form of a root, tuber or bulb, or grown entirely above or on the ground.

As already indicated, the compositions according to the present invention possess not only antifungal but also antibacterial activity. Thus they have been found to be effective against Verticillium wilt and other blights that affect tomatoes, and against other bacteria named hereinbelow. They are effective also against the fungi causing potato scab.

The new compositions are preferably prepared in the form of dusts or of liquid concentrates. The latter can be diluted by the farmer or other user by mixing, say, one hundred gallons of water with an amount of the concentrate such that the suspension contains about 0.0005% to 0.01% or somewhat more of the active compound. Thus the soil can be saturated with a suspension containing 5 to 20 p.p.m., or it can be sprayed with a suspension containing a considerably higher proportion of the active compound and then turned over to distribute the suspension.

The compound 2,6-bis-(dimethylaminomethyl)-cyclohexanone in particular has shown extraordinary effectiveness especially against the soil and seed-borne microorganisms which attack the roots of various species of beans. As is known, vast areas have been rendered unprofitable for the growth of bean crops in the United States because known antimicrobial agents have proved ineffective in controlling the fungi and bacteria infesting such areas. The immense regions devoted to the growth of bean crops in Central and South American countries, where beans are the staple crop, have had to be cultivated despite poor yields per acre with crops of poor quality. Tests conducted with the above-named compound have shown that the destructive microorganisms can be controlled therewith and much higher yields are obtained and at the same time a product of better quality and uniformity. The field tests have established that the compound is far more effective as an antifungal agent in the soil than was indicated by in vitro tests in the laboratory synthetic test media, especially against rootrot.

Phytotoxicity tests have been conducted also with a variety of other crop-producing plants with surprising results both in view of the relatively high concentration of the composition at which damage first appears compared with the concentration necessary to inhibit fungal and/or bacterial growth, but also with respect to the quality of the crop and in many cases also the increased size of the crop. Tests have been conducted on corn (Penn. 290), soy beans (Clark), peanuts, cotton (Coker 100A), sugar beets, cabbage, tomatoes (Rutgers), cucumbers (early Fulton), alfalfa (Dupuit), clover (Pennscott) and oats (Gary). With all of these plants a markedly enlarged and healthy root system, as well as an abundant and healthy growth above ground was obtained.

The compounds employed in the present invention have shown a useful activity at about two pounds per acre (distributed over a 3" depth) and very good activity at 5 to 20 pounds per acre. Slight phytotoxic damage occurred only at about 40 pounds per acre with certain plants, while with other plants no damage was observed at as high as 75 lbs. per acre. The useful range is generally from about 5 to 20 pounds per acre, but with some compounds and some plants it may be considerably higher.

In tests conducted on red kidney beans in standard fashion with a control plot in the immediate vicinity which received no fungicide and with as identical as possible comparison plots wherein there was utilized a well-known commercial agricultural fungicide, the 2,6-bis-(dimethylaminomethyl)-cyclohexanone showed a decided advantage from the standpoint of yield of crop, percentage of plants having undamaged ("clean") roots, and requisite poundage of the fungicide per acre.

As against an average of 19.2% of clean-rooted red kidney bean plants grown in three separate plots in soil which had not been pretreated with a fungicide ("the control"), the maximum of any plot being 23.8%, the application of 5 pounds per acre of the cyclohexanone compound in three separate plots yielded an average of 32.8% with an individual maximum of 41.8% of clean-rooted plants, while the application of 10 pounds per acre yielded an average of 63.3% with a maximum of 75.0% of clean-rooted plants, without any sign of phytotoxicity. This was in contrast to a ratio of clean-rooted plants averaging only 36.1% for three plots with an individual plot maximum of only 44.0% when a well-known soil fungicide was applied in similar manner at the rate of 20 pounds per acre, while 40 pounds per acre of the known fungicide yielded an average of only 58.0% of clean-rooted plants with an individual plot maximum of 65.6%. The improved results with much lower concentrations of the fungicide applied pursuant to the present invention is thus evident.

The above test results were obtained on plots on which the kidney beans had been planted quite late (towards the end of June), and because of a very early freeze, the crop had to be harvested early, namely, on Sept. 11. Nevertheless, there was a considerable increase in the crop on a weight basis of the plots which had been treated with the cyclohexanone compound at the rate of only 10 pounds per acre. It has been expertly estimated that the probable increase in the crop yield of kidney beans planted earlier and harvested later, as is the general practice, would be of the order of 50 to 60% and possibly more as compared with untreated soil.

In tests with harvester snap beans, two plots were sown with the beans after the ground had been sprayed with a suspension of 2,6-bis-(dimethylaminomethyl)-cyclohexanone at the rate of 10, 25 and 50 p.p.m., and then rototilled to a depth of three inches. As against 3 control plots which were untreated but similarly planted, and yielded bean plants of which only 36.3% showed clean roots whereas 33.6% had roots with large, deep lesions and/or no tap roots, the treated plots gave an average of 82.1% of clean roots at 10 p.p.m., 84.6% at 25 p.p.m. and 82.0% at 50 p.p.m. In one series of treated plots, 3.5% of the plants treated at 10 p.p.m. had severely damaged roots while at 25 and 50 p.p.m. there was slight dwarfing. However, in another series of treated plots there was neither damage nor dwarfing and the plants were in excellent condition.

Sometimes the soil is infected by seed-borne microorganisms and in such case it is desirable to treat the seeds prior to planting with the compositions of the invention, the soil being treated prior to, simultaneously with, or subsequent to the planting. The seeds can, for example, be sprayed with compositions or slurries thereof containing 5 to 100 or more p.p.m. of the active compound. Thus, the seeds of cucumbers can be directly treated against angular leafspot caused by *Pseudomonas lachrymans*; the seeds being protected further by way of treatment of the soil as above described. In the case of eggplant blight, caused by *Phomopsis vexans*, or of bacterial spot in peppers caused by *Xanthomonas vesicatoria*, it is best to treat the seeds directly and thereby insure sterilization of the soil in direct contact with the seeds in addition to sterilizing the soil for a depth of 3 inches. In the case of lima, snap, kidney, pinto and other beans, sterilization of the soil as above described aids also in protecting the plants against the bacterial blight caused by *Xanthomonas phaseoli*, and the bacterial blight of celery caused by *Pseudomonas apii* is similarly inhibited. The various species of beans can be protected also against the halo blight caused by *Pseudomonas phaseolicola*. Both the seed and the soil can be treated to protect tomatoes against the bacterial canker caused by *Corynebacterium michiganese*, and against the bacterial spot caused by *Xanthomonas vesicatoria*. The seeds of eggplants and the soil can be treated to protect them against blights caused by *Phomopsis vexans*.

In terms of parts per million, the soil is treated so as to contain approximately 2 to 40 p.p.m. of the active compound, the preferred range in most cases being about 5 to 20 p.p.m. As above indicated, one pound per acre distributed throughout a 3 inch depth of soil is considered to be equivalent to 1 p.p.m.

In tests carried out on plots seeded with early Fulton cucumbers, best results were obtained when the cyclohexanone compound was applied to the soil at a concentration of only 5 p.p.m. (5 pounds per acre to a 3" depth), this treatment yielding a high quality product and at a rate which was more than 4,400 pounds per acre above the yield of untreated plots. At 10 p.p.m. the yield was over 3,000 pounds above the "control" plots.

On transplanting, and prior to placing them in treated soil, young plant roots can be dipped in the various formulations to protect them more fully against fungal attack.

The high activity of the compositions of the invention when applied to the soil was most surprising in view of the fact that laboratory tests with synthetic media had shown that cyclic ketone diamine bases described and claimed herein had no fungicidal activity of any commercial significance. In fact, the activity of the bases was considered to be limited to bactericidal action. Nevertheless, applicant had the 2,6-bis-(dimethylaminomethyl)-cyclohexanone subjected to field tests along with other compounds, and it was then found that even during the early stages of growth of the seedlings an unusually large proportion of clean and vigorous root systems were in evidence and this was confirmed at harvest time, as stated hereinabove.

While I do not wish to be committed to this theory, it appears that under the action of various components of the soil, either organic or inorganic, the di-(substituted amino lower alkyl)-cycloketones are converted into another substance or substances having far higher antifungal activity than is exhibited by the compounds themselves in standard laboratory tests.

As is evident from the foregoing, the concentrations necessary for antimicrobial effectiveness are well below the concentrations at which damage to the plants occurs.

In addition to spraying or dusting, the compositions can also be injected into the soil in known manner and the soil then turned over. The compositions can also be applied after the planting of the seeds. A single application at planting time is usually sufficient, but a further treatment may be applied later in the growing season.

The active compounds can be prepared for agricultural use in the form of dusts, pastes and various liquid concentrates carrying the active compound or compounds in solution (in the case of the salts), or in suspension. The various preparations preferably contain one or more of the usual emulsifiers, surfactants, suspending agents, wetting agents, spreading agents, conditioning agents, sticking agents and the like to promote stability and uniform distribution in water or in the common organic solvents employed for spraying, and also spreading and adhesion. Both in the powdered and in the liquid forms, as already indicated, the compounds can be used as seed dressings to insure direct and immediate contact with fungicide-containing soil and thereby destroy seed-borne fungus spores and bacteria.

It should be noted that the acid salts of the active compounds have high water solubility. Thus, if compositions containing these salts are applied in outdoor locations there is a likelihood that the active agent would be washed away by rain. Therefore, it is desirable under these circumstances to apply the active agent in the form of the free base which is not water soluble. However, it has been found that these bases will deteriorate upon prolonged direct contact with water. Thus, it is not feasible to market an aqueous suspension of the base for further dilution in water although such a product would be desirable.

In order to avoid such deterioration it has been found desirable to dissolve the base in a water immiscible nonhydroxylic organic solvent. This solution may be emulsified directly with water or preferably emulsified with water by means of an adjuvant, for example, any suitable dispersing agent. When compounded in this manner, it has been found that the free base is encapsulated in the organic solvent and although it may thereafter be intimately distributed in an aqueous medium, it is protected from the deterioration which would otherwise occur during prolonged contact with water. Thus, solutions of the free bases in a nonhydroxylic water immiscible solvent with or without the presence of an adjuvant such as a dispersing agent and compositions comprising a solution of the free bases in a nonhydroxylic water immiscible solvent with or without the presence of an adjuvant such as a dispersing agent emulsified with water, suitably relatively small amounts of water are within the contemplated scope of the present invention.

For manufacturing the liquid concentrates, the commonly employed water immiscible nonhydroxylic organic solvents can be used as liquid extenders, such as chlorinated aliphatic hydrocarbons, aromatic hydrocarbons, and petroleum fractions and distillates, either alone or mixed with water and an emulsifying agent in the form of an emulsion. The additions or adjuvants can be of such nature that highly viscous mixtures or pastes are obtained. Thus the compositions can contain surfactants of various kinds, including cationic, anionic, and non-ionic compounds. The non-ionics are the preferred surfactants and include alkylphenol-ethylene oxide condensation products, such as isooctylphenol-polyethylene oxide condensates (Triton X– 100 and X–120) the various "Spans" (sorbitan monopalmitate, stearate or oleate), and "Tweens" (e.g., sorbitan monolaurate-Tween 20).

Other surface-active agents that can be included in the formulations for application as a spray include sodium alkyl sulfates ("Dreft"), alkyl and alkyl-aryl sulfonates ("Nacconal NR" and Dupont "MP–189"), alkyl-aryl sulfonates ("Spans"), ethylene oxide addition products ("Tweens"). These materials can constitute from .05 to 10% of the active agent.

The anionics, being neutral salts, are satisfactory adjuvants and include, for example, sodium decyl benzene sulfonates ("Santomerse D"); sodium dioctyl sulfosuccinate, sodium salt of coconut fatty acids, and sodium lignin sulfonate.

An adhesive, if employed, can be in the range of about one half of five percent of the active material. The adhesives can be in the form of resins which are soluble or dispersible in water, and include cellulose ethers, waxes, polyvinyl pyrrolidine, and powdered polyethylene. Sticking agents may also be included in small proportion (about one half to five percent of the active substance), these including glycerin and non-volatile polyethylene glycols. In general, about one to five parts of a dispersing agent can be employed for one hundred parts of the fungicidal material.

In the case of dusts, the inert carrier can range in percentage composition from about one percent to 80 percent of the total composition. The solid, inert additions, such as clays, talc, bentonite, attapulgites, pyrophyllites, diatomaceous earth, fuller's earth, chalk, rock phosphates, and also chemically modified minerals such as acid-washed bentonite, precipitated calcium phosphate and carbonate, colloidal silica, mica, pumice, vermiculite, wood flour, and grain flours, and inert metal oxides and hydroxides such as titanium dioxide, aluminum oxide, and bauxite, and other mineral powders may be oil treated to increase their adhesivity, the oil being either a mineral hydrocarbon oil or a vegetable or animal fatty oil. The powders are preferably below 50 micron particle size.

Various suspending agents can also be included in the composition, such as sodium or calcium salts of lignin sulfonic acids. Among the conditioning agents may be mentioned sodium phosphate or polyphosphate, various alkoxy celluloses, such as methyl cellulose and other cellulose ethers, and the sodium salt of cellulose glycolic acid. These mixtures are diluted with water and applied to the soil. Adjuvants can be mixed with the active material before use or they may be admixed with the active material in the marketed composition. The mixtures are then added to water or other suspending agent just prior to use.

The surfactant material is employed in the proportion of about one to five percent based on the total composition. The suspending agents act to increase the viscosity and to keep insoluble solids in suspension and also to aid stabilizing the emulsion.

In the form of liquid compositions the fungicides described hereinabove can be dispersed in water immiscible organic liquids, including petroleum spray oils of a boiling point range of 275–575° F. The fungicide can be finely ground into the oils and the dispersion, preferably containing an emulsifier, sold in such form for admixing with water prior to use.

It is desirable at times to use a volatile solvent for the fungicide, for example hexane, which evaporates a short time after application to the soil.

For spraying seeds with the fungicide compositions there can be employed non-phytotoxic oils like refined mineral oil or non-drying or only partially drying vegetable oils like castor oil, olive oil, soy bean oil, and the like. The spray composition in slurry or highly dilute suspension form can include in addition to various proportions of water, also benzene, chlorobenzene, higher dialkyl ethers, like dibutyl ether, while fluoro-trichloromethane, dichloro-difluoro-methane, and other highly volatile liquids can be employed for aerosol sprays, such sprays being especially useful where it is desired to have no residual solvent. Suitable oils for suspending the fungicides are diesel engine oil and Stoddard solvents, which include the higher boiling petroleum fractions, like the higher boiling range naphthas.

The various additions above described can be considered as homogenizing agents which keep the compounds in uniform suspension in the concentrated form in which they are preferably marketed, and also promote uniform distribution in the much larger volumes of water or other liquid with which they are to be mixed prior to application to the soil.

For formulating wettable powders, various adjuvants and surface active agents can be employed such as are listed in Soap and Chemical Specialties, vol. 31, No. 7, pp. 61 Ed. Seq.; No. 8, pp. 48–61; No. 9, pp. 52–57 and No. 10, pp. 38–67 (1955) and in Bulletin No. 607 of the Bureau of Entomology and Plant Quarantine, Department of Agriculture, Washington, D.C. Carboxymethylcellulose is a highly satisfactory material for use as a thickening or conditioning agent.

In the form of liquid concentrates, the active component can comprise from 5 to 95 percent by weight of the composition, the remainder being the liquid carrier which can include any of the additions above discussed. Compositions in the form of emulsions in organic liquids can contain a small proportion of water to facilitate subsequent mixing with water should that be desired.

The following specific compositions are presented by way of illustration:

EXAMPLE A

Wettable powder: Parts by weight
2,6-bis-(dimethylaminomethyl)-cyclohexanone _ 25
Finely particled absorbent clay _____ 73
Alkylphenoxypolyethoxyethanol _____ 2

The cyclohexanone compound is distributed by spraying over the finely powdered clay while the latter is vigorously agitated, or the two materials are vigorously mixed, and thereafter the wetting agent is mixed into the resulting powder. About 10 to 40 pounds of this powder can be mixed at a farm with 30 to 60 gallons of water and the suspension sprayed over an acre of ground disked or rototilled to a depth of three inches.

EXAMPLE B

Emulsifiable liquid: Parts by weight
2,6-bis-(dimethylaminomethyl)-cyclohexanone __ 5
Diproplyeneglycolmonomethyl ether _____ 50
Anhydrous xylene _____ 40
Alkylphenoxypolyethoxyethanol _____ 5

Fifty to 300 lbs. of the liquid preparation are emulsified with 30 to 60 gallons of water per acre for distribution in the soil to a 3 inch depth.

EXAMPLE C

A concentrated paste can be prepared by mixing for example, one of the cyclohexanone compounds with methyl cellulose and small amounts of sodium lignin sulfonate. The resulting mixture, if not already a paste, can then be stirred with sufficient water to yield a paste of the desired viscosity. A suitable mixture is the following:

Dispersible paste: Parts by weight
2,6-bis-(dimethylaminomethyl)-cyclohexanone __ 90
Methyl cellulose _____ 4
Sodium lignin sulfonate _____ 6

The paste is prepared by simply mixing the materials, if desired with an addition of cold water, and then the resulting paste can be used to make dispersions in water by simple dilution. The resultant suspensions can then be employed as agricultural sprays.

In the case of cotton, for which the soil need be turned over for only a two inch depth, a correspondingly smaller amount of the active compound need be used. On the other hand, when the soil is plowed or turned over to a depth of 6 inches, as for potatoes, a correspondingly larger amount of the antimicrobial compound per acre is used.

Procedures for the preparation of the compounds employed in the present invention are described in the above-mentioned application Ser. No. 165,028 and are incorporated herein by reference. The following examples are reproduced for purposes of illustration but it will be understood that the present invention is not limited to the described compounds nor to their method of preparation, it being noted that the reactions do not involve the addition of a basic catalyst.

Example 1.—2,6-bis-(di-n-propylaminomethyl)-cyclohexanone

To a mixture of 49 gms. cyclohexanone and 65 ml. water there were added 100 gms. di-n-propylamine keeping the temperature at 24–26° C. The reactants were mixed for 15 minutes and then 82 gms. 37% aqueous formaldehyde were slowly added so that the temperature did not exceed 30° C. The mixture was then heated on a steam bath for two and one-half hours. It was cooled to 80° C., 20 gms. of powdered sodium chloride were added and dissolved in the aqueous phase. The upper oil layer was separated, the water layer cooled and extracted with several portions of benzene. The combined benzene extracts and oil were clarified by filtration and freed of solvent and unreacted components by fractional distillation in vacuo.

The reaction was repeated using equimolecular quantities of other secondary amines in place of the di-n-propylamine. These included di-2-ethylhexylamine, diethanolamine, di-allylamine, morpholine and others, yielding 2,6-bis-(di-2-ethylhexylaminomethyl) - cyclohexanone, 2,6-bis-(diethanolaminomethyl)-cyclohexanone, 2,6 - bis-(di - allylaminomethyl) - cyclohexanone, 2,6 - bis - (morpholinomethyl)-cyclohexanone, respectively, etc. The bases thus obtained were soluble in dilute acids, insoluble in alkali, and easily miscible with most of the common organic solvents and oils.

Example 2.—2,5-bis-(dimethylaminomethyl)-cyclopentanone dihydrochloride 70 gms. cyclopentanone, 55 gms. paraformaldehyde, 400 ml. glacial acetic acid, and 73 gms. dimethylamine hydrochloride were mixed and allowed to stand at room temperature for 16 hours. The mixture was then heated for 1 hour on the steam bath. It was clarified by filtration, and then mixed with a large volume of acetone and petroleum ether to precipitate the dihydrochloride of the 2,5-bis-(dimethylaminomethyl)-cyclopentanone, M.P. 186–187° C. after recrystallization from ethyl acetate-petroleum ether. Additional material could be recovered from the mother liquor.

Example 3.—2-(dibenzylaminomethyl)-6-(dimethylaminomethyl)-cyclohexanone

Step 1.—This mono-substituted intermediate was prepared according to J. Org. Chem., vol. 24, 1069 (1939). A mixture of 9.8 g. cyclohexanone, 1.5 g. of paraformaldehyde, 11.7 g. dibenzylamine hydrochloride, and 50 ml. acetic acid was heated for 2.5 hrs. at 55–65° C. The solvent was removed under reduced pressure at a temperature below 65° C. The oily residue was dissolved in hot acetone. The crystalline product which separated from the cold solution melted at 239–240° C.

Step 2.—The mono-substitution product obtained in Step 1 can be employed as the free base or hydrochloride for additional reaction with other secondary amines and aldehydes or ketones as previously described. Reaction techniques and conditions follow these already outlined. The products obtained have the nitrogen-methane groupings on the two alpha carbon atoms joined to the cyclic carbonyl, e.g. 2 - (dibenzylaminomethyl) - 6 - (dimethylaminomethyl)-cyclohexanone and its dihydrochloride.

Example 4.—2-(dimethylaminomethyl)-6-(piperidinomethyl)-cyclohexanone dihydrochloride Following the instructions in F. F. Blicke et al., J. Org. Chem., 24, p. 1074 (1959), a mixture of 19.2 g. of 2-(dimethylaminomethyl)-cyclohexanone hydrochloride, 3.0 g. paraformaldehyde, 12.2 g. of piperidine hydrochloride and 40 ml. of acetic acid were maintained at 95° C. for 2.5 hours, using agitation to obtain, finally, a clear solution. The solvent was removed on a steam bath under reduced pressure and the product, 15.5 g., was recrystallized from methanol ether, M.P. 168–169° C.

Example 5.—2,6-bis-(dimethylaminomethyl)-cyclohexanone

To 49 gms. cyclohexanone there was added 46 gms. dimethylamine in the form of a 40% aqueous solution, keeping the temperature at 15° to 20° C. The reactants were mixed for 15 minutes and then 82 gms. 37% aqueous formaldehyde was slowly added so that the temperature did not exceed 30° C. The mixture was then heated on a steam bath for two and one-half hours. It was cooled to 80° C., 20 gms. of powdered sodium chloride were added and dissolved in the aqueous phase. The upper oily layer was separated, and the water layer cooled and extracted with several portions of benzene. The combined benzene extracts and oil were clarified by filtration and freed of solvent and unreacted components by fractional distillation in vacuo. The obtained liquid was soluble in dilute acids like hydrochloride, sulfuric and acetic acids, and was miscible with methanol, ethanol, ether, and other common organic solvents and also with petroleum fractions.

The compounds in which one or more of $X_1$ to $X_4$ in the general formula presented hereinabove are hydrogen, are not prepared by the use of primary amines, as these would lead to side reactions by reason of the additional active hydrogens. They are preferably prepared by the use of secondary amines whose substituents can be removed in known manner after the condensation reaction with the carbonyl-containing compounds. Thus by the use of dibenzylamine, followed by debenzylation according to known procedures, as by treatment with hydrogen in the presence of a palladium catalyst in hydrochloric acid solution, compounds can be obtained in which all of $X_1$ to $X_4$ are hydrogen; while by the use of ethylbenzylamine, followed by debenzylation, only one hydrogen will be attached to each nitrogen atom. By the use of a two-step process, using first, for example, dibenzylamine, and methylbenzylamine in the second step, followed by debenzylation, products are obtained in which three of the groups $X_1$ to $X_4$ are hydrogen; while if, for example, dimethylamine or diethylamine is employed in the second step, two hydrogens will be attached to the same nitrogen. These di-primary amine, di-secondary amine, and mixed primary-secondary, primary-tertiary and secondary-tertiary amine compounds so obtained can be converted into salts with acids.

Although formaldehyde and its polymers are the preferred aldehyde compounds for linking the "parent" ketone with the amine, other aldehydes like α-plurality substituted acetaldehyde and butyraldehyde, such as dimethyl acetaldehyde and α,α-diethyl-butyraldehyde, benzaldehyde, and the like, can be substituted for the formaldehyde. Similarly, with higher aliphatic aldehydes utilized in place of the formaldehyde, those will yield the simpler condensates conforming to the above formula which are sufficiently substituted at the α-carbon to eliminate active hydrogen. The formaldehyde can be replaced also by ketones capable of reacting with the secondary amines and with the cycloalkanone to form condensation products corresponding to the general formula presented above, such ketones including poly-substituted acetones and other parent aliphatic ketones having up to 7 carbons, such as polymethyl and polyethyl acetone, benzyl-polyethyl acetone, cyclopentyl-polyethyl acetone, cyclohexyl-polymethyl acetone, s-dibenzyl polymethyl acetone, polymethyl di-n-propyl ketone, and the like. The substituents can include, in addition to alkyl groups, other non-interfering groups selected from the class consisting of chlorine, bromine, $NO_2$, hydroxyl, lower alkoxy, and the like.

To improve water-solubility, and as already indicated, the bases can be converted into salts, as by reaction in known manner with the hydrochloric, sulfuric, acetic, and p-toluene sulfonic acids and the like. The quarternary salts are obtained by reacting the bases in the usual manner with a hydrocarbon halide or the like, such as methyl chloride, bromide or iodide, benzyl chloride. The dihydrochloride, acetate, methyl chloride, and benzyl chloride addition compounds (salts) of, for example, the 2,6-bis-(dimethylaminomethyl)-cyclohexanone and 2,5-bis-(dimethylaminomethyl)-cyclopentanone are examples of such addition compounds.

I claim:
1. The method of protecting seeds and plants against fungal and bacterial attack which comprises applying to the soil an antifungal and antibacterial amount of a composition whose active ingredient consists essentially of a compound selected from the group consisting of bases of the formula:

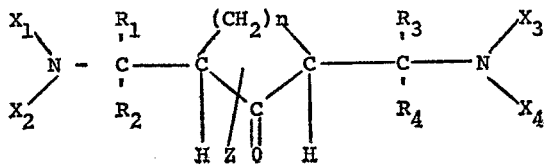

and their acid addition salts and quarternary salts, wherein:
$R_1$ to $R_4$ are each a member of the group consisting of hydrogen, alkyl having up to 18 carbons, and cycloalkyl having up to 9 carbons;
$X_1$ to $X_4$ are each a member of the group consisting of hydrogen, alkyl having up to 18 carbons, hydroxyalkyl having up to 8 carbons, cycloalkyl having up to 9 carbons, benzyl and radicals formed when either of the pairs $X_1$ and $X_2$ or $X_3$ and $X_4$ are taken together selected from the group consisting of morpholino, piperidino, thiazolino, pyrrolidino and piperazino radicals;
$n$ is an integer from 1 to 6, inclusive; while
Z is a member selected from the class consisting of hydrogen, halogen, nitro, lower alkyl, lower alkoxy, hydroxyl, phenyl, and phenyl-lower alkyl.

2. The method of claim 1 which comprises applying to the soil a composition of claim 1 whose active ingredient consists essentially of a 2,6-bis-(dimethylaminomethyl)-cyclohexanone.

3. The method of claim 2 which comprises applying to the soil a dust whose active component consists essentially of 2,6-bis-(dimethyl-aminomethyl)-cyclohexanone at a concentration in the soil of about 2 to 75 p.p.m.

4. The method of claim 2 which comprises applying to the soil an aqueous suspension of 2,6-bis-(dimethylaminomethyl)-cyclohexanone at the rate of about 5 to 20 lbs. per acre of the said compound.

5. An antimicrobial composition comprising a solid carrier suitable for application to soil for protecting seeds and plants and a compound of the group of compounds of claim 1, said compound being present in the composition in sufficient quantity to inhibit the growth of destructive fungi and bacteria.

6. A composition according to claim 5 wherein the active component is in the form of an acid salt.

7. A composition according to claim 6 wherein the acid salt is the hydrochloride.

8. A composition according to claim 5 wherein the solid carrier is an inert pulverulent carrier.

9. A composition according to claim 8 wherein the active compound is 2,6-bis-(dimethylaminomethyl)-cyclohexanone.

10. A composition according to claim 8 wherein the active compound is 2,6-bis-(dimethylaminomethyl)-cyclopentanone.

11. A composition according to claim 8 wherein the active compound is 2,6-bis-(dimethylaminomethyl)-4-phenyl-cyclohexanone.

12. A composition according to claim 5 additionally comprising a surface active agent for facilitating suspension of the composition in a water immiscible non-hydroxylic solvent.

13. A composition according to claim 5 additionally comprising a surface active agent for facilitating suspension of the composition in water.

14. A composition according to claim 13 wherein the active compound is 2,6-bis-(dimethylaminomethyl)-cyclohexanone.

15. A composition according to claim 13 wherein the active compound is 2,6-bis-(diethylaminomethyl)-cyclohexanone.

16. A liquid antimicrobial concentrate prepared for application to the soil comprising a non-hydroxylic water immiscible solvent, an active material consisting essentially of a cyclic ketone diamine base as defined in claim 1, and a nonionic surface active agent for facilitating uniform distribution of the concentrate in water, and wherein said composition contains the solvent, from 5–95% of said active ingredient, and from 1–5% of said surface active agent.

17. An antimicrobial composition according to claim 16 comprising 2,6-bis-(dimethylaminomethyl)-cyclohexanone.

18. A composition according to claim 17 wherein the non-hydroxylic water immiscible solvent is xylene.

19. A composition according to claim 17 additionally comprising water.

20. A composition according to claim 19 wherein the solvent is xylene.

References Cited

Blicke et al.: Journal of Organic Chemistry, vol. 24, 1959, pp. 1069–1076.

ALBERT T. MEYERS, *Primary Examiner.*

JEROME D. GOLDBERG, *Assistant Examiner.*

U.S. Cl. X.R.

424—248, 250, 267, 270, 274, 330